Jan. 25, 1927.

F. C. MOCK ET AL 1,615,398

CARBURETOR

Filed May 8, 1925      5 Sheets-Sheet 1

Witnesses:
William P. Kilroy
Harry R. L. White

Inventors
Frank C. Mock
Charles J. Gustafson
Milton E. Chandler
By Brown, Boettcher & Dienner Attys.

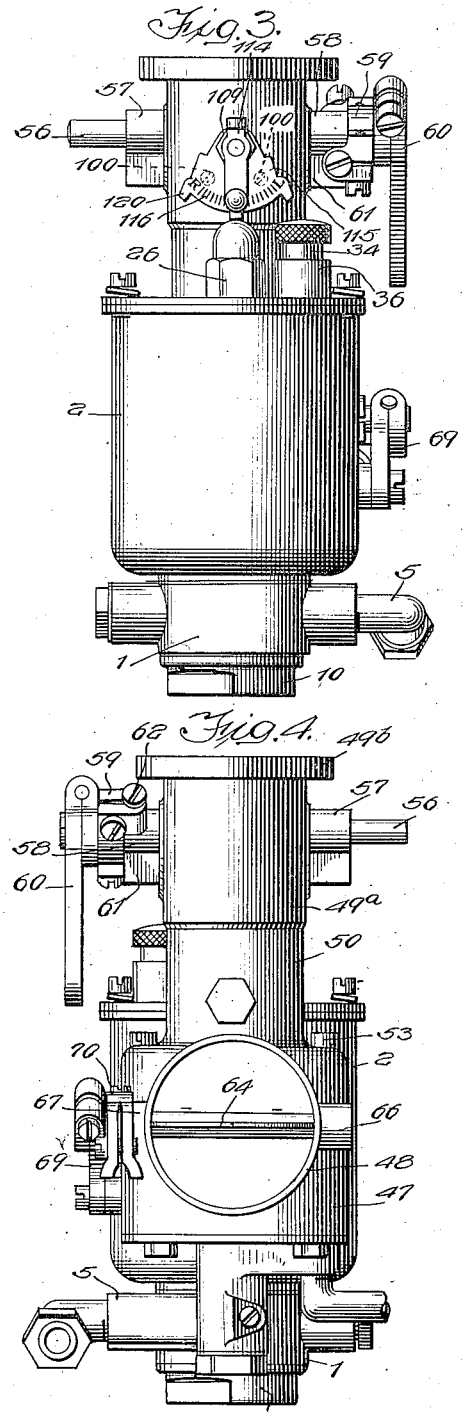

Jan. 25, 1927.
F. C. MOCK ET AL
1,615,398
CARBURETOR
Filed May 8, 1925    5 Sheets-Sheet 3
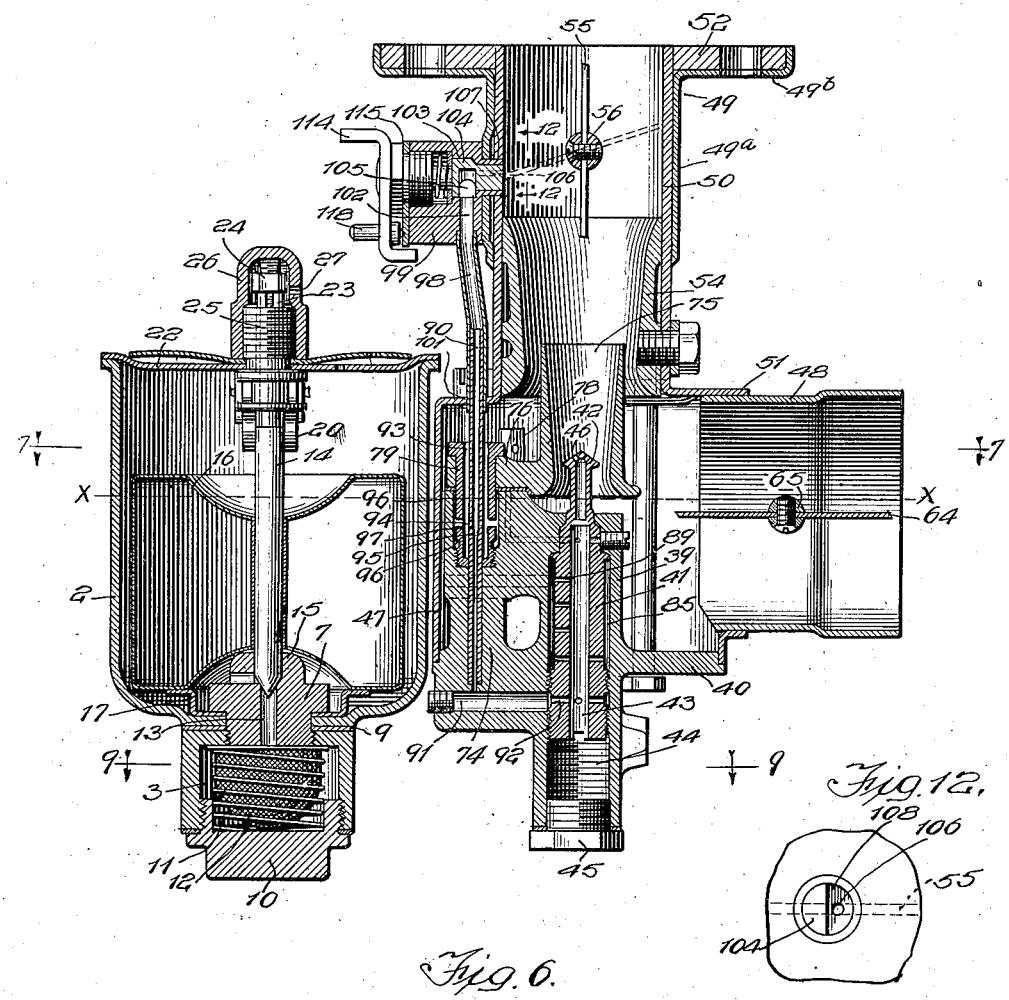
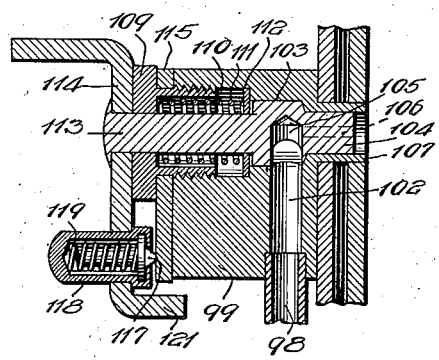
Witnesses:
William P. Kilroy
Harry L. White
Inventors
Frank C. Mock
Charles J. Gustafson
Milton E. Chandler
By Brown, Boettcher & Dienner
Attys

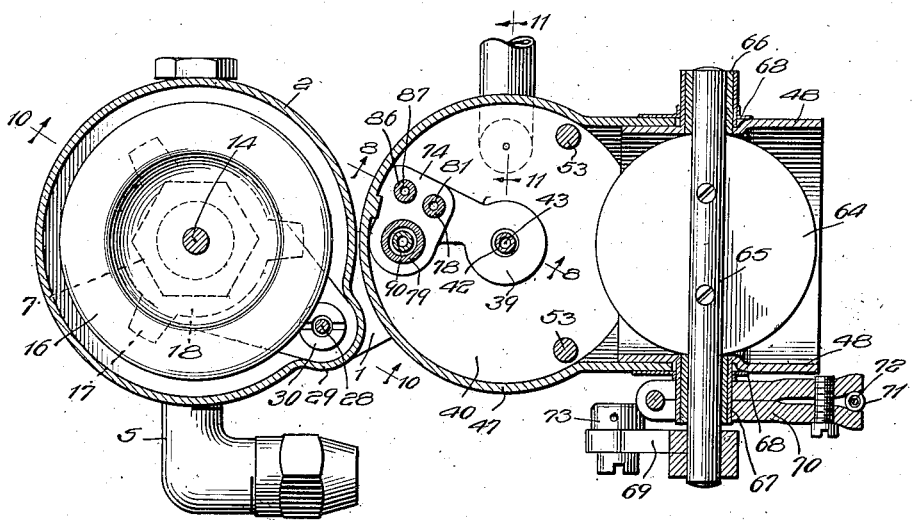
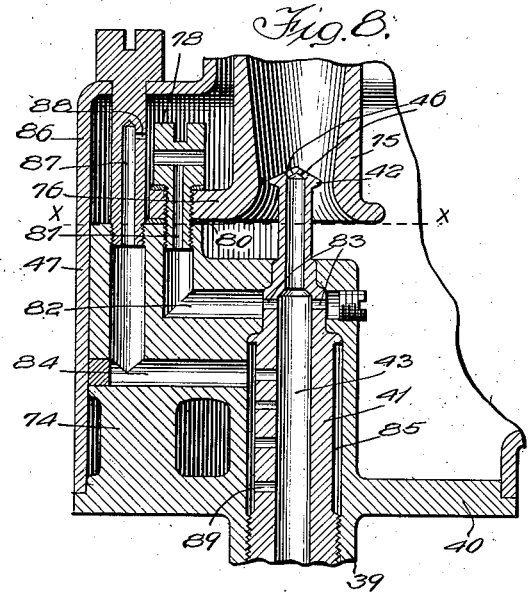

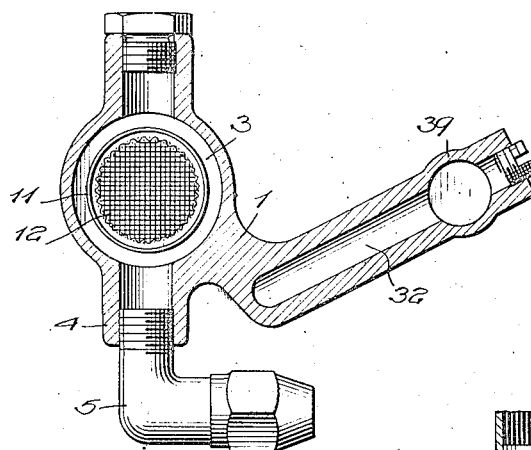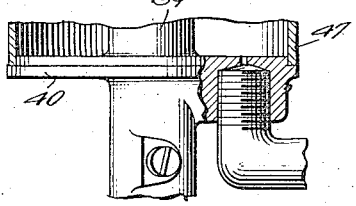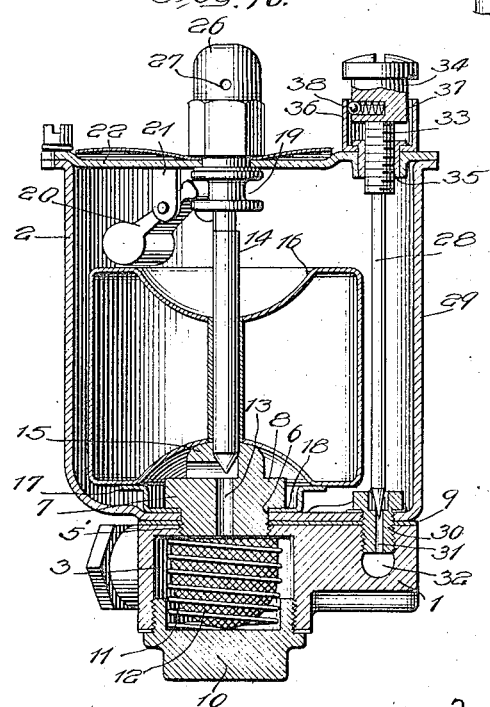

Patented Jan. 25, 1927.

1,615,398

UNITED STATES PATENT OFFICE.

FRANK C. MOCK, CHARLES J. GUSTAFSON, AND MILTON E. CHANDLER, OF CHICAGO, ILLINOIS, ASSIGNORS TO STROMBERG MOTOR DEVICES COMPANY, OF CHICAGO, ILLINOIS, A CORPORATION OF ILLINOIS.

CARBURETOR.

Application filed May 8, 1925. Serial No. 28,771.

Our invention relates to carburetors, and, in general, the object is to provide construction and arrangement which will materially decrease the weight, the manufacturing cost, and the resistance to flow through the air inlet, carbureting and outlet passageways, and which will increase the strength of the structure, give greater accessibility to the vital and adjustable parts and greater accuracy and convenience of adjustment of such parts, and which will provide greater convenience and practicability in the assembly of the various parts and will fully protect them.

More in detail, an important object of the invention is to mount the important and delicate fuel supply and controlling elements on a supporting body and to enclose and protect them by a shell or housing which provides the air inlet, carbureting, and mixture outlet passageways, such shell or housing being of parts drawn from strong sheet metal.

Another important object of the invention is to provide a fuel or float cup drawn from sheet steel to form a strong protecting housing for the fuel supply valve and its controlling float and other fuel regulating valve mechanism. The formation of these various parts from sheet metal by means of dies not only very materially decreases the weight of the carburetor and increases its strength, but it materially reduces the manufacturing cost, such sheet metal construction eliminating the loss on account of blow holes, false operations, and other conditions incident to the manufacture where the entire carburetor is in the form of a casting. The smooth drawn sheet metal parts will also greatly reduce the resistance to the flow of air and fuel in the various passageways, and in this respect will make carburetors of more uniform and standard operation.

Another important object is to provide for ready and easy separation of the body shell or housing from the supporting body so that the various fuel controlling and flow regulating parts are readily accessible for accurate inspection and adjustment.

Other important features of our invention reside in the improved construction of various controlling parts and their support on and connection with the sheet metal housing parts.

Referring to the drawings:—

Fig. 3 is an elevational view of the float chamber side of the carburetor;

Fig. 4 is an elevational view of the opposite side of the carburetor;

Fig. 5 is a sectional view on the plane 5—5 of Fig. 1;

Fig. 6 is an enlarged sectional view of the idling fuel jet and its regulating mechanism;

Fig. 7 is a sectional view on the plane 7—7 of Fig. 5;

Fig. 8 is an enlarged sectional view on the plane 8—8 of Fig. 7;

Fig. 9 is a sectional view on the plane 9—9 of Fig. 5;

Fig. 10 is a sectional view on the plane 10—10 of Fig. 7;

Fig. 11 is a sectional view on the plane 11—11 of Fig. 7;

Fig. 12 is a view from plane 12—12 of Fig. 5 showing the inlet end of the idling nozzle.

Figure 1:
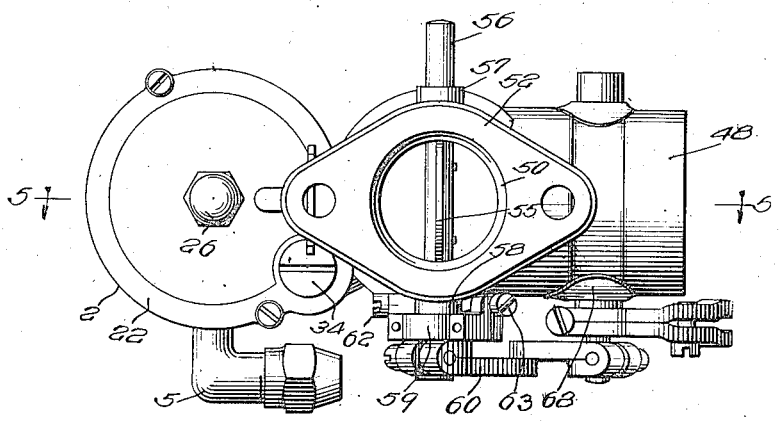
Fig. 1 is a plan view of our improved carburetor.
Figure 2:
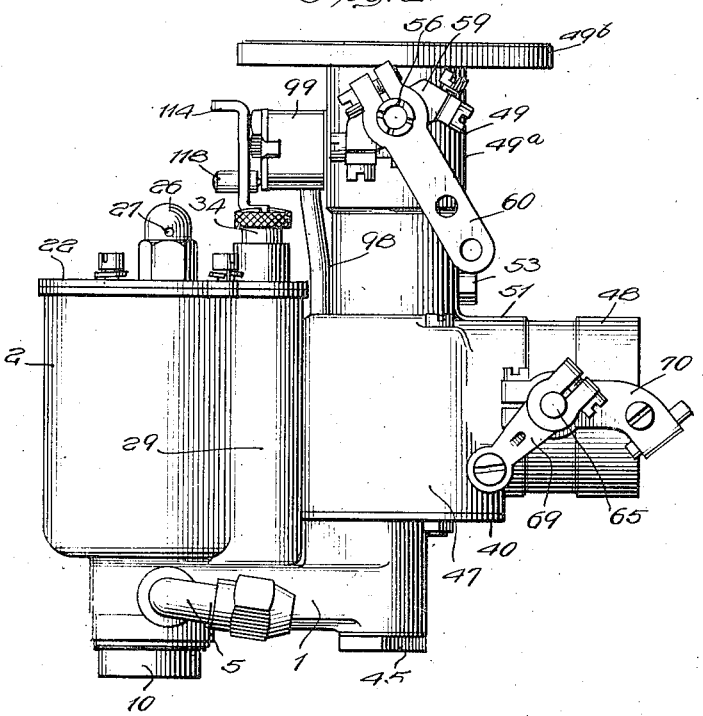
Fig. 2 is a side elevational view.

The main body 1 of the carburetor is in the form of a casting on one end of which is supported the float chamber or cup 2. In the body part below the float cup is the strainer chamber 3 with which communicates the inlet boss 4 connected by a fitting 5 with the pipe line leading to the gasoline supply tank. The upper wall of the chamber 3 has the threaded opening 5' registering with the opening 6 in the floor of the float cup, a plug 7 extending through the opening 6 and threading into the opening 5 and having the flange 8 for securely locking the float cup on the body part, a gasket 9 of lead being preferably interposed in order to secure a sealed connection between the cup and the strainer chamber. A plug 10 threads into the bottom of the strainer chamber and serves as an abutment for the spring 11 which holds the strainer 12 securely against the top wall of the strainer chamber to strain fuel before it reaches the passageway 13 through the plug 7. The upper end of the passageway 13 forms a seat for the conical lower end of the needle valve 14, the extension 15 on the plug 7 forming a guide for the lower end of the valve. The float 16 surrounds the needle valve and when in its lower position, is supported on the legs 17 extending upwardly from the annular frame 18 which is held in place by being clamped between the float cup bottom and the flange 8 of the plug 7. At its upper end the valve stem 14 has the groove 19 receiving the inner ends of the float levers 20 which are pivoted in ears 21 deflected out of the float cup cover 22 which is of sheet metal. The groove part 19 forms part of a sleeve 23 which receives the threaded upper end of the valve stem so as to be adjustable thereon, a lock nut 24 securing the parts in adjusted position. The sleeve 23 extends beyond the cover 22 and through a threaded bushing 25 secured to the cover, a cap 26 engaging the bushing to enclose and protect the upper end of the needle valve structure. This cap may be provided with an atmosphere inlet opening 27 for the flow of air through the bushing 25 and into the float chamber.

The fuel outflow from the float chamber is controlled by the high speed needle valve 28 which extends downwardly through the semi-circular enlargement or deflection 29 formed in the float chamber wall. A valve seat plug 30 extends through the bottom of the float chamber and threads into the body part 1, its passageway communicating with the passageway 32 through the body part. The plug 30 assists the plug 7 in firmly holding the float chamber against the top of the main body 1.

At its upper end, the needle valve 28 is secured in the threaded stem 33 extending from the head 34, the stem threading through the bushing 35 extending through and secured to the cover structure 22. The circular wall 36 is secured between the bushing 35 and the cover and surrounds the head 34 and has latch grooves 37 in which latch balls 38 engage to yieldingly lock the head 34 and consequently the valve 28 in any adjusted position.

The fuel passageway 32 leads to the bottom of the vertical well casing 39 which, intermediate its ends, supports the circular horizontal shelf 40. The well casing 39 is threaded on its interior for the insertion from its lower end of the main nozzle structure 41 whose outlet end 42 extends from the upper end of the well casing, the nozzle structure having the axial bore 43 communicating at its lower end with the well 44 in the casing 39 below the nozzle structure. A plug 45 forms the bottom of the well 44. The nozzle end 42 is shown as conical and is provided with outlet ports 46.

The housing or enclosing shell structures is composed of sections drawn from sheet metal and intimately secured together. The structure comprises the hood section 47, the air inlet section 48, and the coupling flange section 49. The hood section is cylindrical and at its lower end seats on the circular shelf 40 to surround the well casing 39. The hood part has the vertical cylindrical extension 50 coaxial therewith but of reduced diameter, and the hood part has also the lateral inlet flange 51 for telescopically receiving the inner end of the air inlet cylindrical section 48. The part 48 is rigidly locked to the flange 51 preferably by means of spot welding.

The coupling flange section 49 has the cylindrical part 49ª intimately receiving the upper end of the reduced section 50 of the hood member, and having the transversely extending part 49ᵇ at its upper end for attachment with a companion coupling flange on the engine manifold. The flange part 49ᵇ may be strengthened by a metal insert or filler 52. The coupling flange section 49 is preferably rigidly secured to the part 50 by means of spot welding. Screws 53 extend through the top wall of the hood part 47 and threads into the shelf 40 to thus detachably hold the housing on the shelf in operative and protecting position.

Within the lower part of the extension 50 is secured the main Venturi tube 54, and in the upper part is the throttle valve 55 secured on the stem 56. The stem 56 is journaled in bearing lugs 57 and 58 rigidly secured to the housing part 49ª by welding or otherwise. Secured to one end of the stem are the stop beam 59 and the throttle lever 60, the wing 61 on the bearing lug 58 furnishing an abutment for the adjustable stop screws 62 and 63.

In the air inlet pipe 48 is the choke valve 64 secured on the stem 65 which is journaled in the bearing sleeve structures 66 and 67 secured to the pipe 48 by their flanges 68, as by spot welding. To one end of the stem 65 is secured the choke lever 69, and to the bearing sleeve 67 is secured the holder arm 70 for the tube 71 which, in practice, runs to the dashboard and guides the operating wire 72 whose end is secured to the rotatable head 73 on the choke lever 69.

On top of the extension 74 on the main body 1 is mounted the small Venturi tube 75 co-axially with the nozzle 41 and with the main venturi 54. The nozzle end opens into the small venturi a short distance beyond its throat, while the small venturi opens into the large Venturi tube a short distance beyond its throat, as clearly shown in Fig. 5. The small Venturi tube 75 has the lateral extension 76 over the body part 74 and through openings in this extension extend the plug or screw 78 and the tube 79, which tube, as will be explained later, forms a priming well. The tube securely holds the small Venturi structure on the body part 74, a gasket 80 preferably of soft metal being inserted to provide a seal fit.

The plug 78 threads into the body part 74 to bring its passageway 81 into communication with the passageway 82 in the part 74, which passageway 82 leads through reduced openings 83 into the bore 43 of the nozzle structure 41, the passageway 82 together with the nozzle bore forming a high speed well which is open at the top through the passageway 81 to the pressure within the housing structure S.

Below the passageway 82 in the body part 74 is the passageway 84 leading downwardly to the top of the space 85 between the well casing 39 and the reduced diameter section of the nozzle structure 41, this space together with the passageway forming an accelerating well. Extending into the upper end of the passageway 84 is the screw 86 which has the passageway 87 connected by the bleed inlet 88 with the interior of the housing S. The head of the screw 86 engages the top of the hood part 47 of the housing S and assists the screws 53 in holding the housing securely on the shelf 40.

The space 85 is connected with the nozzle bore through tiers of small passageways 89 for successively bleeding air into the nozzle bore to keep the fuel flowing from the bore supplied with the proper amount of air and to prevent excess flow or waste of fuel.

The tube 79 threads at its lower end in the body part 74, and extending axially through the tube is the lower part 90 of the idling tube structure which extends through the bottom of the supporting tube 79 and through the part 74 to the cross passageway 91 connected by reduced passageways 92 with the nozzle bore 43 near the base of the nozzle. The space 93 between the tubes 79 and 90 forms a priming well which is connected with the interior of the tube 90 through ports 94, the tube 90 being restricted just in advance of these ports, as indicated at 95. The tube 79 above its threaded end is also displaced a distance from the body part 74 to leave additional priming well space 96 which communicates with the space 93 by ports 97. The well 93 at its upper end is open to the interior of the housing structure S.

The upper section 98 of the idler tube structure is secured to and depends from the idler nozzle supporting frame 99 which is secured against the side of the housing part 49 by screws 100. The tube section 98 at its lower end extends through the hole 101 in the top of the hood part 47 and telescopically receives the upper end of the lower idler tube section 90 when the housing structure S is applied to the shelf 40.

The tube section 98 communicates with the passageway 102 which leads to the nozzle chamber 103 in which the idler nozzle 104 is rotatable. The passageway 102 communicates with the nozzle passageway 105 from which extends the discharge port 106 which communicates with the interior of the housing part 50 adjacent to the throttle valve 55. The nozzle end projects through the bushing 107 at the end of the nozzle supporting frame 99, which bushing passes through suitable openings in the side walls of the housing parts 50 and 49ᵃ and assists the screws 100 in securely holding the frame 99 in place. The nozzle port 106 is at one side of the nozzle axis, as clearly shown in Fig. 12 and terminates in a recess or transverse passageway formed by cutting away part of the nozzle end.

A tubular plug 109 threads into the pocket 110 which cooperates with a spring 111 and a washer 112 to hold the nozzle head within its seat 103. The nozzle stem 113 extends through the plug, and at its outer end has secured thereto the adjusting lever 114. Between the head of the plug 109 and the body 99 is clamped the quadrant plate 115 having a row of small notches 116 in the path of the latch plunger 117 projecting from the barrel 118 carried by the lever 114, the spring 119 yieldingly forcing the plunger against the quadrant and so serving to lock the idler nozzle in any adjusted position. To prevent excessive swing of the lever 114, stop extensions 120 are provided at the lower corners of the quadrant plate for the abutment deflection 121 at the lower end of the lever 114.

The operation of the device is as follows:—

When the engine is not operating, the gasoline is at normal level in the float chamber and the various wells and passageways connected therewith, as shown by line x—x on the drawings. For starting, or for idling or very low running, the throttle is closed. When the engine is now turned over, practically the entire suction effect will be concentrated on the idle nozzle port 106, and the fuel will be drawn out of the priming well 93, air to the amount of that which can travel through the recess 108 in the idle plug mixing with the fuel, and this rich mixture is drawn into the engine and starts it. The priming well at its upper end is open to the interior of the housing S and when the well is emptied of its charge down as far as the ports 94, air will bleed into the idler outlet tube and then the suction effect will become effective at the idle well 91 for supplying the fuel for idling or slow running, adjustment being made by means of the lever 114 connected with the idling nozzle. In Figs. 6 and 12, the lever is shown in intermediate position with the port outlet opposite the throttle valve edge and the air recess or passageway 108 vertical. When the lever and valve are rotated clockwise (Fig. 3), or counterclockwise (Fig. 12), the port 106 will be raised above the throttle valve edge and will then be more exposed to the suction effect above the throttle, and as the air passageway 108 will be correspondingly restricted, a richer mixture will flow to the engine. When adjustment is made in the opposite direction, the idling port will be moved away from the suction effect and the mixture will be leaner.

The choke valve 64 is operated in proper association with the idling system. With the priming well incorporated in the idling system, the engine will usually start in the warmer months of the year without the use of the choke control. In colder weather the choke control will be used in proper association with the throttle valve.

For the higher or ordinary driving speeds, the throttle is opened and the main fuel nozzle becomes effective and supplies the necessary fuel. The high speed or main driving adjustment is regulated by the high speed needle valve 28 which controls the flow through the outlet passageway 31 from the float chamber. This needle valve is set for the minimum outlet opening that will give smooth running and maximum engine speed under certain settings of the throttle and spark lever when adjustment is being made, and then when the engine is driven it will operate efficiently throughout the ordinary range of speed.

When the throttle is opened to increase the speed after starting or idling, the fuel in the upper end of the nozzle and in the well 82 will be available for quick service, but as soon as the ports 83 are uncovered any excess outflow of fuel will be prevented, air flowing down through the bleeder passage 81 in the plug 78 and mixing with the fuel. During ordinary running of the engine there will be sufficient fuel at the upper end of the nozzle to supply the demand. For a sudden unusual speed requirement or acceleration, the well 85 becomes effective. Opening of the throttle in accordance with the desire for such increased speed or acceleration will result in corresponding increase in the suction effect and the air bleed passageway 81 will no longer be sufficient to satisfy the increased suction and fuel will be taken up from deeper down in the nozzle passageway 43. However, excess fuel flow will be prevented by the successive exposure of the ports 89 to air inflow through the bleeder inlet 78 and passageway 84. The amount of air bled into the fuel flow is thus gradually increased until the proper mixture will be established for efficient and economical running under acceleration. After such acceleration operation, the fuel will again rise in the nozzle and restore normal condition. For sudden acceleration demand the bleeder passages will lag sufficiently in their control to permit discharge from the nozzle of an adequate supply of fuel to efficiently meet the demand, but after the sudden demand is met, the fuel flow falls back to normal in accordance with the effective operation of the bleeder ports.

The carburetor shown has no air valves or metering needles, the air passages and fuel jets being all of fixed size for all engine speeds. Its construction is such that the proper mixture is applied for all speeds, exact setting being made possible by the provision of separate and easily regulated high and low speeds adjustments. The accelerating well construction gives a prompt response to the throttle with an economical mixture setting. The low speed adjustment shown gives exceptionally smooth and steady idle and low speed operation. The priming will greatly facilitate starting by automatically furnishing a rich priming charge when the engine is cranked.

The formation of the body housing of sheet metal parts, and the formation of the float chamber from a single piece of sheet metal constitutes a radical departure in the manufacture of carburetors. It eliminates the liability of loss in material and labor due to defective castings, and materially reduces the manufacturing cost. Another decided advantage of such drawn sheet metal parts is that the extensive interior surface of the air inlet and carbureting chambers is inherently smooth, thus greatly reducing the resistance to flow and correspondingly increasing the efficiency of the carburetor. Such smooth uniform surface cannot be obtained in the ordinary cast carburetors without expansive machine finishing work. It will also be noted that with our improved construction and arrangement, the fuel flow controlling elements can be compacted and brought close together so that drilling and other fitting and finishing work will be reduced to a minimum. Furthermore, such compacting together of these elements makes adjustment more easy, and the elements are fully protected by the sheet metal housing structure which can be readily removed from the carburetor body to expose the various elements for inspection and adjustment.

Having described our invention, we claim as follows:—

1. A carburetor comprising an integral cast body part, a vertical well casing forming part of said body part, a fuel nozzle within said well casing projecting from the upper end thereof, a shelf forming an integral past of said body part and surrounding said well casing, a sheet metal housing detachably mounted on said shelf to surround the well casing and providing an air inlet and a mixture outlet, and a sheet metal fuel container mounted on said body part adjacent to said shelf and having connection with said nozzle.

2. In a carburetor, the combination of a body part in the form of an integral casting, a vertical well casing at one end of said body part, a nozzle projecting through said well casing, a detachable fuel container at the other end of said housing, means for conducting fuel from said container to said nozzle, a shelf surrounding said well casing, a support on said shelf adjacent said well casing, said support and shelf being integral with said body part, a Venturi tube mounted on said support to cooperate with said nozzle, and a detachable housing mounted on said shelf and providing an air inlet and a mixture outlet passageway.

3. In a carburetor, the combination of a body part, a fuel nozzle projecting upwardly at one end of said body part, a fuel container mounted on the other end of said body part for supplying fuel to said nozzle, a primary Venturi tube supported on said body part, a housing having detachable supports on said body part to enclose said nozzle and Venturi tube, and providing an air inlet passageway and an outlet passageway, a secondary Venturi tube supported in the outlet passageway of said housing above said primary Venturi tube, and a throttle valve in said housing.

4. In a carburetor, the combination of a body, fuel controlling elements thereon, a fuel reservoir on said body, and a housing detachably mounted on said body, said housing comprising a hood section receiving said fuel controlling elements, an air inlet section, and a coupling section; said sections being integrally drawn from sheet metal and intimately secured together.

5. In a carburetor, the combination of a body part, means thereon for controlling fuel flow, and a housing for said fuel flow controlling means, said housing comprising a base section receiving said fuel flow controlling means and a reduced outlet section, said housing being drawn integral from sheet metal, said base section having a lateral flange, an air inlet tube secured in said flange, a coupling part secured to said outlet section, and means within said reduced section for controlling the mixture outflow.

6. A carburetor comprising a body part, fuel supply and fuel control elements mounted thereon, and a sheet metal housing structure detachably mounted on said body, said housing comprising a base section receiving said fuel controlling elements and having an extension forming a mixture outflow passageway, said base section having a lateral air inlet.

7. In a carburetor, the combination of a body part, a fuel supply and fuel discharge controlling elements mounted on said body part, and a housing part drawn integral from sheet metal and comprising a substantially cylindrical base part and a reduced outlet section, said base section receiving said fuel discharge controlling elements.

8. In a carburetor, the combination of a body part, fuel supply and fuel discharge controlling elements mounted on said body part, and a housing drawn integral from sheet metal and comprising a substantially cylindrical base section and a reduced outlet section, said base section receiving said fuel discharge controlling elements, said base section having a lateral flange deflected therefrom, and an air intake passage member secured in said flange.

9. In a carburetor, the combination of a supporting body, fuel supply and fuel discharge controlling elements on said body part, and a drawn metal housing structure detachably mounted on said body part, the main part of said housing structure having a substantially cylindrical base for enclosing the fuel discharge controlling elements and having a cylindrical vertical outlet section of reduced diameter, said base having a lateral flange deflected therefrom forming a lateral air inlet, and a coupling part receiving said outlet section.

10. In a carburetor, the combination of a body part, fuel supply and fuel discharge controlling elements supported on said body part, a tubular sheet metal housing part providing an outlet passageway at its upper end and having its lower end expanded to form a hood for enclosing said fuel discharge controlling element, and an air inlet to said housing part.

11. In a carburetor, the combination of a body part, fuel supply and fuel discharge controlling elements supported on said body part, and a housing part formed from a single piece of sheet metal tubing, the upper end of said housing part forming an outlet passageway and its lower end being expanded to form a hood for enclosing said fuel discharge controlling elements, and a lateral flange deflected from said hood section forming an air inlet.

12. In a carburetor, the combination of a body part, fuel supply and fuel discharge controlling elements supported thereon, and a housing structure, said housing structure comprising a main part formed from a single piece of sheet metal tubing, the upper end of which forms an outlet passageway and the lower end of which is expanded to form a hood for enclosing said fuel supply and discharge controlling elements, said lower expanded part having a lateral flange deflected therefrom, an air inlet member secured in said flange, and a tubular reenforcing member receiving the upper end of said main housing part and being expanded at its upper end to form a coupling flange.

13. In a carburetor, the combination of a body part, fuel supply and fuel discharge controlling elements supported thereon, and a housing structure, said housing structure comprising a main part formed from a single piece of sheet metal tubing whose upper end forms an outlet passageway and whose lower end is expanded to form a hood for enclosing said fuel supply and fuel discharge controlling elements, said hood part having a flange laterally deflected therefrom, a tubular inlet member telescopically secured in said flange, and a tubular reenforcing section telescopically receiving the upper end of said main part and expanded at its upper end to form a coupling flange.

14. In a carburetor, the combination of a body part, fuel supply and fuel discharge controlling elements supported on said body part, a main housing part formed from a single piece of sheet metal tubing whose upper end provides a mixture outlet passageway and whose lower end is expanded to form an enclosing hood for said fuel discharge controlling elements, a flange deflected laterally from said hood part, a tubular extension secured in said flange, an air inlet controlling means in said extension, a tubular member receiving and strengthening the upper end of said main housing part and expanded at its upper end to form a coupling flange, a throttle valve within the outlet passageway supported on said reenforced housing part, and fuel discharge controlling mechanism mounted on said reenforced housing part and connected with said fuel discharge controlling mechanism within said hood part.

15. In a carburetor, the combination of a body part, fuel discharge controlling elements supported on said body part, a housing structure formed of drawn sheet metal part intimately secured together, said housing structure comprising a base section with a vertical outlet passageway and a lateral air inlet passageway, said housing structure being mounted on said body part with its base enclosing said fuel discharging controlling elements, a fuel outlet controlling attachment at the outside of said housing structure and secured to the upper end thereof and communicating with the interior thereof, a connection from said attachment extending through the wall of said housing base part and having detachable connection with said fuel discharge controlling elements, and a throttle valve in the upper end of said housing structure outlet passageway.

16. In a carburetor, the combination of a supporting body part, fuel supply means supported on said body part, a main fuel nozzle supported on said body part and connected with said fuel supply means, a tubular substantially cylindrical housing structure detachably mounted on said body part and having its lower end expanded to form a hood for closing said main nozzle, the upper end of said housing forming an outlet passageway, an idling well supported on said body part within the hood of said housing structure and connected with said fuel supply means, an idling fitting outside of and secured to the upper end of said housing structure, an idling nozzle in said fitting communicating with said outlet passageway, and detachable telescropic tube sections extending from said fitting to said well.

17. In a carburetor, the combination of a body part, fuel delivery elements mounted thereon, a fuel cup drawn integral from sheet metal supported on said body part, a vertical recess deflected in one side of said cup, said body part having a passageway leading to said fuel delivery elements, a valve outlet connecting said cup with said passageway, and a valve extending in said recess and operable from the top of said cup for controlling said valve outlet.

18. In a carburetor, the combination of a nozzle structure, a shelf thereon, a lateral extension on said nozzle structure forming a support for fuel supply controlling wells, a small Venturi tube secured on said extension and in co-axial alignment with said nozzle structure, a detachable sheet metal enclosure shell seated on said shelf concentric with said nozzle structure and small Venturi tube, a large Venturi tube within said shell above said small Venturi tube, and a throttle valve above said large Venturi tube.

19. In a carburetor, the combination of a casting forming a nozzle structure and a lateral support thereon, a shelf on said casting, a fitting detachably seating in said extension and forming a fuel supply controlling well, a small Venturi tube detachably secured to said extension by said fitting and positioned above said nozzle structure co-axial therewith, a sheet metal shell detachably applied on said shelf to surround said casting, the upper end of said shell being contracted to form an outlet passageway, a large Venturi tube in said outlet passageway above said small Venturi tube, and a throttle valve in said passageway above said large Venturi tube.

20. In a carburetor, the combination of a supporting casting, a circular shelf on said casting, a nozzle projecting above said shelf, a well fitting adjacent to said nozzle, a detachable sheet metal shell seated on said shelf and enclosing at its lower end said nozzle and well fitting, the upper end of said shell being contracted to form a mixture outlet passageway, a throttle valve in said outlet passageway, an idling plug structure supported on the side of said contracted shell part and having an idling outlet cooperating with said throttle valve, and a supply duct for said idling plug extending outside of said contracted shell part and through the bottom part thereof into said well fitting.

21. In a carburetor, the combination of a supporting casting, a circular shelf on said casting, a nozzle projecting above said shelf, a well fitting adjacent to said nozzle, a detachable sheet metal shell seated on said shelf and enclosing at its lower end said nozzle and well fitting, the upper end of said shell being contracted to form a mixture outlet passageway, a throttle valve in said outlet passageway, an idling plug structure supported on the side of said contracted shell part and having an idling outlet cooperating with said throttle valve, and a supply duct for said idling plug extending outside of said contracted shell part and through the bottom part thereof into said well fitting, said duct being jointed for permitting separation of said shell from said shelf.

In witness whereof, we hereunto subscribe our names this 4th day of May, 1925.

FRANK C. MOCK.
CHARLES J. GUSTAFSON.
MILTON E. CHANDLER.